(No Model.)

D. WERTZ.
CAR COUPLING.

No. 324,968. Patented Aug. 25, 1885.

Witnesses:
Sam'l R. Turner
P. B. Turpin

Inventor:
Daniel Wertz
By R. S. & A. P. Lacey attys

UNITED STATES PATENT OFFICE.

DANIEL WERTZ, OF FAYETTE, MISSOURI.

CAR-COUPLING.

SPECIFICATION forming part of Letters Patent No. 324,968, dated August 25, 1885.

Application filed January 6, 1885. (No model.)

*To all whom it may concern:*

Be it known that I, DANIEL WERTZ, a citizen of the United States, residing at Fayette, in the county of Howard and State of Missouri, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to car-couplings; and it consists in certain novel constructions, combinations, and arrangement of parts, which will be hereinafter described and claimed.

Figure 1:
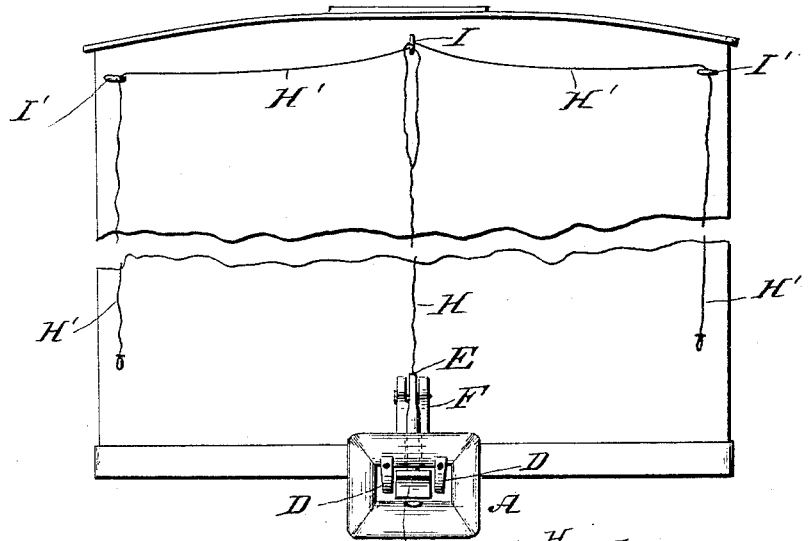
Figure 2:
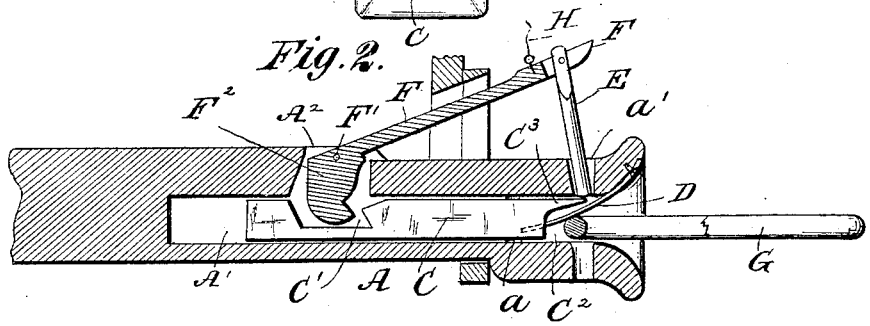
Figure 3:
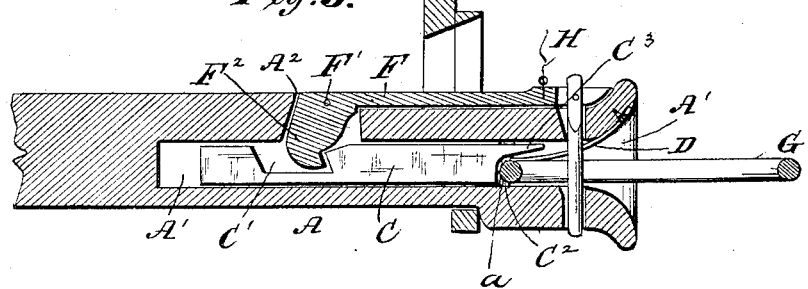

In the drawings, Figure 1 is an end view of a car provided with my improvements. Figs. 2 and 3 are vertical longitudinal sections drawn through the draw-head.

The draw-head A is provided with a longitudinal mortise, A', which is intersected near its inner or rear end by a vertical mortise, A², cut through the top of the draw-head. The mortise A' is made wider toward its outer end from about the point $a$.

A bumper-block, C, is placed and movable in the slot A', being fitted to the rear or narrow part of such mortise and made of less width than the outer wider portion of same, to provide space for the link-supporting springs D. These springs D are secured at one end to the draw-head within the mortise A', and have their other ends disposed on opposite sides of the outer end of the bumper-block, and operate in a manner which will be hereinafter described.

The sliding bumper-block is provided in its upper side near its rear end with a mortise, C', and it has a mortise, C², cut in the lower edge of its forward end, by which is formed the forwardly-projected extension C³. It will be understood, however, that the said extension might be formed separate from the bumper-block, and bolted or otherwise suitably secured thereto.

The pin E is supported on the outer end of the arm F, which is pivoted at F', near its rear end, to the draw-head, and provided with a depending crank, F², the point of which enters the mortise C' in the sliding block. It will be noticed that by raising the pin E, which operates into and through holes $a'$ in the draw-head, the crank F² will engage the forward wall of mortise C' and carry the bumping-block forward until its extension C³ will extend partly or wholly under the upper opening $a'$. The point of pin E meanwhile has been raised to a point above such extension C³, when by lowering the pin it will rest on the extension C³, and will be supported thereby, as shown in Fig. 2. The link G, entering the draw-head, will strike the block C under the extension C³, and will force same back. This, by means of crank F², will operate the arm F and cause pin E to descend through the link G and couple the cars, as will be understood from Fig. 3.

I prefer to form the bumper-block with extension C³, as by same the pin is supported until the link has been inserted well into the draw-head, though it will be understood that the said extension could be dispensed with and the front end of the bumper-block be made square.

When the link G is in place, as shown in Fig. 3, the springs D bear on the opposite side bars thereof and will hold the link in a horizontal line, as shown in Fig. 3, so that the said link will properly enter the draw-head of an approaching car. These springs, it will be seen, do not prevent the link from entering the draw-head at an angle, or prevent it from properly coupling into a higher or lower draw-head.

In order to operate the coupling devices from the top or opposite side of the car, I provide a cord, H, which connects with the arm F and extends upward nearly to the top of the car. Here it connects with two cords, H', which extend upward and are carried in opposite directions through a guide, I, and thence one to each side of the car and passed through guides I', and depend in convenient position for operation from the ground. This forms a convenient and easily-constructed mechanism, which obviates the necessity of going between the cars.

Having thus described my invention, what

I claim, and desire to secure by Letters Patent, is—

The combination, in a car-coupling, of the draw-head, the bumper-block C, having extension $C^3$, the pin, the arm F, the cords H H' H', and guides I I' I', substantially as set forth.

In testimony whereof I affix my signature in presence of two witnesses.

DANIEL WERTZ.

Witnesses:
J. H. ARMSTRONG,
JNO. C. SMITH.